(12) United States Patent
Moon et al.

(10) Patent No.: US 12,711,085 B2
(45) Date of Patent: Aug. 18, 2026

(54) STORAGE DEVICE PERFORMING TRANSLATION OF VIRTUAL ADDRESS INTO PHYSICAL ADDRESS FOR ACCESSING BUFFER AND PROVIDING DIRECT MEMORY ACCESS, COMPUTING SYSTEM INCLUDING THE SAME, AND OPERATING METHOD OF THE STORAGE DEVICE

(71) Applicant: Samsung Electronics Co., Ltd., Suwon-si (KR)

(72) Inventors: Youngsuk Moon, Suwon-si (KR); Jaegeun Park, Suwon-si (KR); Jiwon Chang, Suwon-si (KR); Sangmuk Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/610,528

(22) Filed: Mar. 20, 2024

(65) Prior Publication Data

US 2024/0320173 A1 Sep. 26, 2024

(30) Foreign Application Priority Data

Mar. 21, 2023 (KR) ........................ 10-2023-0036919

(51) Int. Cl.
*G06F 13/28* (2006.01)

(52) U.S. Cl.
CPC .......... *G06F 13/28* (2013.01); *G06F 2213/28* (2013.01)

(58) Field of Classification Search
CPC ........................................................ G06F 13/28
USPC ............................................................ 710/22
See application file for complete search history.

(56) References Cited

U.S. PATENT DOCUMENTS

| | | | | |
|---|---|---|---|---|
| 8,055,816 | B2 | 11/2011 | Asnaashari et al. | |
| 8,219,778 | B2 | 7/2012 | Palladino et al. | |
| 8,301,829 | B2 | 10/2012 | Lee | |
| 8,554,987 | B2 | 10/2013 | So et al. | |
| 10,459,852 | B1 * | 10/2019 | Michaud | G06F 13/161 |

(Continued)

FOREIGN PATENT DOCUMENTS

JP 2016081215 A 5/2016

OTHER PUBLICATIONS

Extended European Search Report corresponding to EP 24163684.4. Dated Aug. 19, 2024, (8 pages).

*Primary Examiner* — Titus Wong
(74) *Attorney, Agent, or Firm* — Wolf, Greenfield & Sacks, P.C.

(57) ABSTRACT

A storage device includes a buffer memory, a first direct memory access (DMA) circuit configured to provide data from a host to the buffer memory or data stored in the buffer memory to the host and output a first virtual address, a second DMA circuit configured to provide data read from a non-volatile memory to the buffer memory or the data stored in the buffer memory to the non-volatile memory and output a second virtual address, an address translation circuit configured to translate the first or second virtual address into a physical address when the first or second virtual address is included in a reference range and skip the translation operation when the first or second virtual address is excluded in the reference range. A buffer controller is configured to access the buffer memory based on the physical address of the first or second virtual address that is excluded.

20 Claims, 13 Drawing Sheets

(56) References Cited

U.S. PATENT DOCUMENTS

| | | | | |
|---|---|---|---|---|
| 10,613,881 | B2 | 4/2020 | Lee et al. | |
| 2008/0168479 | A1* | 7/2008 | Purtell | G06F 9/45558 718/1 |
| 2010/0205345 | A1* | 8/2010 | Lundstrum | G06F 12/0623 711/E12.001 |
| 2011/0320644 | A1* | 12/2011 | Craddock | G06F 13/28 710/22 |
| 2015/0032942 | A1* | 1/2015 | de la Iglesia | G06F 11/2094 711/103 |
| 2015/0089150 | A1* | 3/2015 | Kessler | G06F 12/0888 711/139 |
| 2017/0031821 | A1* | 2/2017 | Ramanujan | G06F 12/0638 |
| 2018/0260343 | A1* | 9/2018 | Park | G06F 13/1668 |
| 2019/0146712 | A1* | 5/2019 | Lee | G06F 12/0246 711/103 |
| 2019/0235762 | A1* | 8/2019 | Kaburaki | G06F 12/0864 |
| 2019/0310780 | A1* | 10/2019 | Gholamipour | G06F 3/0679 |
| 2020/0264783 | A1* | 8/2020 | Patel | G06F 3/064 |
| 2021/0191875 | A1* | 6/2021 | Bradshaw | G06F 3/0625 |
| 2021/0326075 | A1 | 10/2021 | Kim | |
| 2022/0139455 | A1 | 5/2022 | Peddle et al. | |
| 2023/0168838 | A1 | 6/2023 | Moon et al. | |

* cited by examiner

110
ROM
115
ADDRESS REMAPPER
113
PROCESSOR
114
119
FLASH INTERFACE
117
FDMA CIRCUIT
112
BUFFER CONTROLLER
118
HDMA CIRCUIT
111
HOST INTERFACE
116

121
CONTROL LOGIC
510
COMMAND DECODER
511
MODE REGISTER
512
CMD
REFRESH COUNTER
545
REF_ADDR
ROW_ADDR
READ ADDRESS MULTIPLEXER
540
560
560a
560b
560c
560d
FIRST BANK ROW DECODER
300
300a
300b
300c
300d
FIRST MEMORY BANK
FIRST SENSE AMPLIFIER
585d
585c
585b
585a
585
ADDR
ADDRESS BUFFER
520
BANK_ADDR
BANK CONTROL LOGIC
530
I/O GATING CIRCUIT
590
DATA I/O BUFFER
595
DQ
COLUMN ADDRESS LATCH
550
COL_ADDR
FIRST BANK COLUMN DECODER
570a
570b
570c
570d
570

FIG. 9

| | PAGE1 | PAGE2 | | PAGEn |
|---|---|---|---|---|
| BANK1 | 0 | 0 | ··· | 0 |
| BANK2 | 1 | 1 | ··· | 0 |
| | ⋮ | ⋮ | ··· | ⋮ |
| BANKn | 0 | 0 | ··· | 1 |

DRAM VALID BITMAP

STORAGE DEVICE PERFORMING TRANSLATION OF VIRTUAL ADDRESS INTO PHYSICAL ADDRESS FOR ACCESSING BUFFER AND PROVIDING DIRECT MEMORY ACCESS, COMPUTING SYSTEM INCLUDING THE SAME, AND OPERATING METHOD OF THE STORAGE DEVICE

CROSS-REFERENCE TO RELATED APPLICATION

This application is based on and claims priority under 35 U.S.C. § 119 to Korean Patent Application No. 10-2023-0036919, filed on Mar. 21, 2023, in the Korean Intellectual Property Office, the disclosure of which is incorporated by reference herein in its entirety.

BACKGROUND

The inventive concept relates to a storage device, and more particularly, to a storage device configured to provide direct memory access (DMA) and flash DMA to a host.

Semiconductor memory devices are classified into volatile memory devices, such as static random access memory (SRAM), dynamic RAM (DRAM), synchronous DRAM (SDRAM), which lose data stored therein when power supply thereto is interrupted, and non-volatile memory devices, such as read-only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), and ferroelectric RAM (FRAM), which retain data stored therein even after power supply thereto is interrupted.

Flash memory is widely used as a mass storage medium in computing systems. Recently developed computing technology may require use of flash memory-based mass storage media with increased performance. To increase the performance of flash memory-based mass storage media, various techniques or devices are being developed.

SUMMARY

Embodiments of the inventive concept provide a storage device providing a direct memory access (DMA) function and reducing multiple access interference when multiple master intellectual property (IP) blocks access a buffer memory of the storage device.

According to an aspect of the inventive concept, there is provided a storage device a storage device including a buffer memory including a plurality of memory banks, a first DMA circuit configured to provide data from a host to the buffer memory or data stored in the buffer memory to the host and output a first virtual address, a second DMA circuit configured to provide data read from a non-volatile memory to the buffer memory or the data stored in the buffer memory to the non-volatile memory and output a second virtual address, an address translation circuit configured to receive the first or second virtual address, translate the first or second virtual address into a physical address when the first or second virtual address is included in a reference range and skip translation when the first or second virtual address is excluded in the reference range, and a buffer controller configured to access the buffer memory based on the physical address or the first or second virtual address that is excluded in the reference range.

According to another aspect of the inventive concept, there is provided an operating method of a storage device. The operating method includes receiving a first virtual address from a first DMA circuit or a second virtual address from a second DMA circuit, translating the first or second virtual address into a physical address of one of a plurality of memory banks included in a first storage area of a buffer memory based on a number of virtual addresses allocated to each of the plurality of memory banks, and writing or reading data to or from the buffer memory based on the physical address.

According to a further aspect of the inventive concept, there is provided a computing system including a host and a storage device configured to store data therein based on control signals from the host, wherein the storage device includes a buffer memory including a dynamic random access memory (DRAM) area, a non-volatile memory device, a first DMA circuit configured to control DMA between the host and the buffer memory and output a first virtual address, a second DMA circuit configured to control DMA between the buffer memory and the non-volatile memory device and output a second virtual address, an address translation circuit configured to translate the first or second virtual address into a physical address of the DRAM area based on a mapping relationship between at least one virtual address and at least one physical address, and a buffer controller configured to access the buffer memory based on the physical address.

BRIEF DESCRIPTION OF THE DRAWINGS

Embodiments will be more clearly understood from the following detailed description taken in conjunction with the accompanying drawings in which:

FIG. 9 is a diagram illustrating a dynamic random access memory (DRAM) valid bitmap according to an embodiment;

DETAILED DESCRIPTION OF THE EMBODIMENTS

Figure 1:
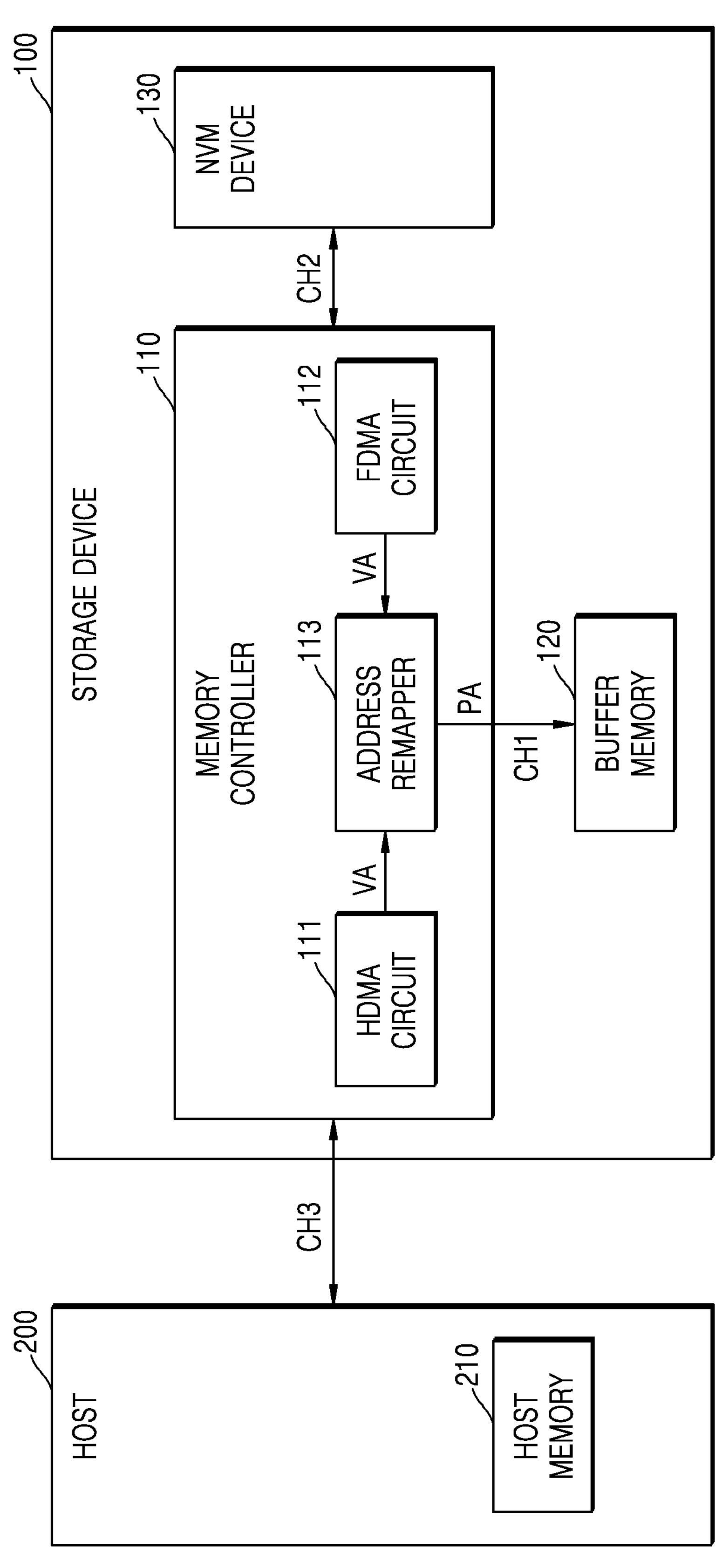
FIG. 1 is a block diagram of a computing system according to an embodiment.

Hereinafter, various embodiments are described with reference to the accompanying drawings. In the accompanying drawings, like reference numerals may refer to like elements, and repeated descriptions of the like elements will be omitted. As used herein, the term "and/or" includes any and all combinations of one or more of the associated listed items. It is noted that aspects described with respect to one embodiment may be incorporated in different embodiments although not specifically described relative thereto. That is, all embodiments and/or features of any embodiments can be combined in any way and/or combination. In the present specification, although terms such as first and second are used to describe various elements or components, it goes without saying that these elements or components are not limited by these terms. These terms are only used to distinguish a single element or component from other elements or components. Therefore, it goes without saying that a first element or component referred to below may be a second element or component within the technical idea of embodiments of the present inventive concept.

FIG. 1 is a block diagram of a computing system according to an embodiment.

FIG. 1 is a block diagram showing a computing system 10 according to an embodiment. Referring to FIG. 1, the computing system 10 may include a host 200 and a storage device 100. For example, the computing system 10 may include a computer, a portable computer, an ultra-mobile personal computer (UMPC), a workstation, a data server, a netbook, a personal digital assistant (PDA), a web tablet, a wireless phone, a mobile phone, a smartphone, a digital camera, a digital audio recorder, a digital audio player, a digital picture recorder, a digital picture player, a digital video recorder, a digital video player, a device that may transmit and receive information in a wireless environment, or any one of various electronic devices forming a home network.

The host 200 may be configured to control operations of the computing system 10. The host 200 may exchange data or information, which is used to drive an operating system (OS) or a program, with the storage device 100.

Under control by the host 200, the storage device 100 may exchange data with the host 200. For example, the storage device 100 may include a mass storage medium, such as a hard disk, a solid-state drive (SSD), a memory card, an embedded memory card, or a memory stick, which is used in the computing system 10.

The storage device 100 may include a memory controller 110, a buffer memory 120, and a non-volatile memory (NVM) device 130. For example, the memory controller 110, the buffer memory 120, and the NVM device 130 may be implemented in separate semiconductor dies, chips, packages, or modules from each other. In other embodiments, some of the memory controller 110, the buffer memory 120, and the NVM device 130 may be implemented in one semiconductor die, chip, package, or module.

Under control by the host 200, the memory controller 110 may write data to the NVM device 130 or transmit data read from the NVM device 130 to the host 200. The memory controller 110 may be configured to exchange various kinds of data (e.g., flash translation layer (FTL) program code or a mapping table), which is necessary for the storage device 100 to operate, with the NVM device 130.

The buffer memory 120 may be configured to temporarily store write data received from the host 200 or data read from the buffer memory 120 under control by the memory controller 110.

For example, a transmission channel CH3 between the host 200 and the memory controller 110 may have a different bandwidth and a different data transmission speed than a transmission channel CH2 between the memory controller 110 and the NVM device 130. To compensate for the speed difference between the transmission channels CH3 and CH2, the buffer memory 120 may be configured to temporarily store write data or read data. The memory controller 110 may communicate with the buffer memory 120 through a transmission channel CH1.

For example, the buffer memory 120 may include high-speed random access memory (RAM), such as static RAM (SRAM), dynamic RAM (DRAM), or synchronous DRAM (SDRAM). In other embodiments, the buffer memory 120 may include NVM, such as read-only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), ferroelectric RAM (FRAM), or thyristor RAM (TRAM). For example, the buffer memory 120 may include a dual-port memory. The buffer memory 120 may be configured to temporarily store write data or read data based on a physical address PA provided from an address remapper 113. Here, the address remapper 113 may be referred to as an address translation circuit.

The NVM device 130 may be configured to store data or provide the stored data to the memory controller 110 under control by the memory controller 110. For example, the NVM device 130 may include NVM, such as ROM, PROM, EPROM, EEPROM, flash memory, PRAM, MRAM, RRAM, FRAM, or TRAM.

According to an embodiment, the memory controller 110 may include a host direct memory access (HDMA) circuit 111, a flash DMA (FDMA) circuit 112, and the address remapper 113. For example, the HDMA circuit 111, the FDMA circuit 112, and the address remapper 113 may be implemented by software, hardware, or a combination thereof.

The HDMA circuit 111 may be configured to control a DMA operation between the host 200 and the buffer memory 120. The FDMA circuit 112 may be configured to control a DMA operation between the NVM device 130 and the buffer memory 120.

For example, the storage device 100 may operate in a DMA mode to increase a data transmission speed. The DMA mode may refer to an operation mode in which data is transmitted under control by the HDMA circuit 111 or the FDMA circuit 112 without intervention by a processor or a core of the memory controller 110. In other words, control or processing by the processor or the core is not required during data transmission and, accordingly, a data transmission speed may be increased. In the DMA mode, the HDMA circuit 111 may control data transmission between the host 200 and the buffer memory 120. The FDMA circuit 112 may control data transmission between the NVM device 130 and the buffer memory 120.

For example, when the memory controller 110 receives a read request from the host 200, the FDMA circuit 112 may be configured to read data (i.e., data corresponding to an address included in the read request) from the NVM device 130 and store the read data in the buffer memory 120, without being controlled by the processor or the core. After the read data is stored in the buffer memory 120, the HDMA circuit 111 may be configured to read and transmit the read data from the buffer memory 120 to the host 200 without being controlled by the processor or the core. The read data may be stored in a host memory 210.

For example, when the memory controller 110 receives a write request from the host 200, the HDMA circuit 111 may be configured to store write data (i.e., data corresponding to an address included in the write request) in the buffer memory 120 without being controlled by the processor or the core. The write data may be stored in a host memory 210. After the write data is stored in the buffer memory 120, the FDMA circuit 112 may be configured to read and transmit the write data from the buffer memory 120 to the NVM device 130 without being controlled by the processor or the core.

For example, to perform an internal operation (e.g., garbage collection, read reclaim, or the like) of the NVM device 130 without intervention by the host 200, the FDMA circuit 112 may be configured to control data to be moved from the NVM device 130 to the buffer memory 120 or from the buffer memory 120 to the NVM device 130 without being controlled by the processor or the core.

A DMA operation between the host memory 210 of the host 200 and the buffer memory 120 may be referred to as an external DMA operation. In the external DMA operation, a DMA operation may be performed by the HDMA circuit 111. A DMA operation between the buffer memory 120 and the NVM device 130 may be referred to as an internal DMA operation. In the internal DMA operation, a DMA operation may be performed by the FDMA circuit 112.

The address remapper 113 may receive a virtual address VA from each of the HDMA circuit 111 and the FDMA circuit 112 and provide a physical address PA corresponding to the virtual address VA. Although it is illustrated in FIG. 1 that only the host 200 and the NVM device 130 access the buffer memory 120, a plurality of master intellectual property (IP) blocks may access the buffer memory 120 through a DMA operation. When a plurality of master IP blocks access one memory bank of the buffer memory 120, the accesses of the master IP blocks are sequentially performed and, accordingly, it may be difficult to efficiently use the buffer memory 120. The address remapper 113 may distribute accesses by a plurality of master IP blocks among a plurality of banks based on the virtual address VA such that the accesses by the master IP blocks may be processed in parallel and, accordingly, the buffer memory 120 may be efficiently used.

When the virtual address VA is included in a mapping address range, the address remapper 113 may provide the physical address PA corresponding to the virtual address VA to the buffer memory 120. When the virtual address VA is excluded in the mapping address range, the address remapper 113 may provide the virtual address VA as the physical address PA to the buffer memory 120.

The address remapper 113 may be configured to count the number of virtual addresses allocated to each of a plurality of banks of the buffer memory 120. In the case of a mapping miss where the physical address PA mapped to the virtual address VA does not exist, the address remapper 113 may map the virtual address VA to the physical address PA of a memory bank having the smallest count value. In the case of a mapping hit where the physical address PA mapped to the virtual address VA exists, the address remapper 113 may provide the physical address PA mapped to the virtual address VA to the buffer memory 120.

The address remapper 113 may be configured to map the virtual address VA to the physical address PA of a certain memory bank according to a DMA mode. For example, the address remapper 113 may map the virtual address VA to the physical address PA of a first memory bank in the external DMA mode and to the physical address PA of a second memory bank in the internal DMA mode.

The address remapper 113 may be configured to map the virtual address VA to the physical address PA of a certain memory bank when the storage device 100 operates in a multi-stream mode. In the multi-stream mode, pieces of data related to one stream identifier may be stored in one memory block of the NVM device 130. For example, the address remapper 113 may map the virtual address VA to the physical address PA of a third memory bank in the multi-stream mode.

Figure 2:
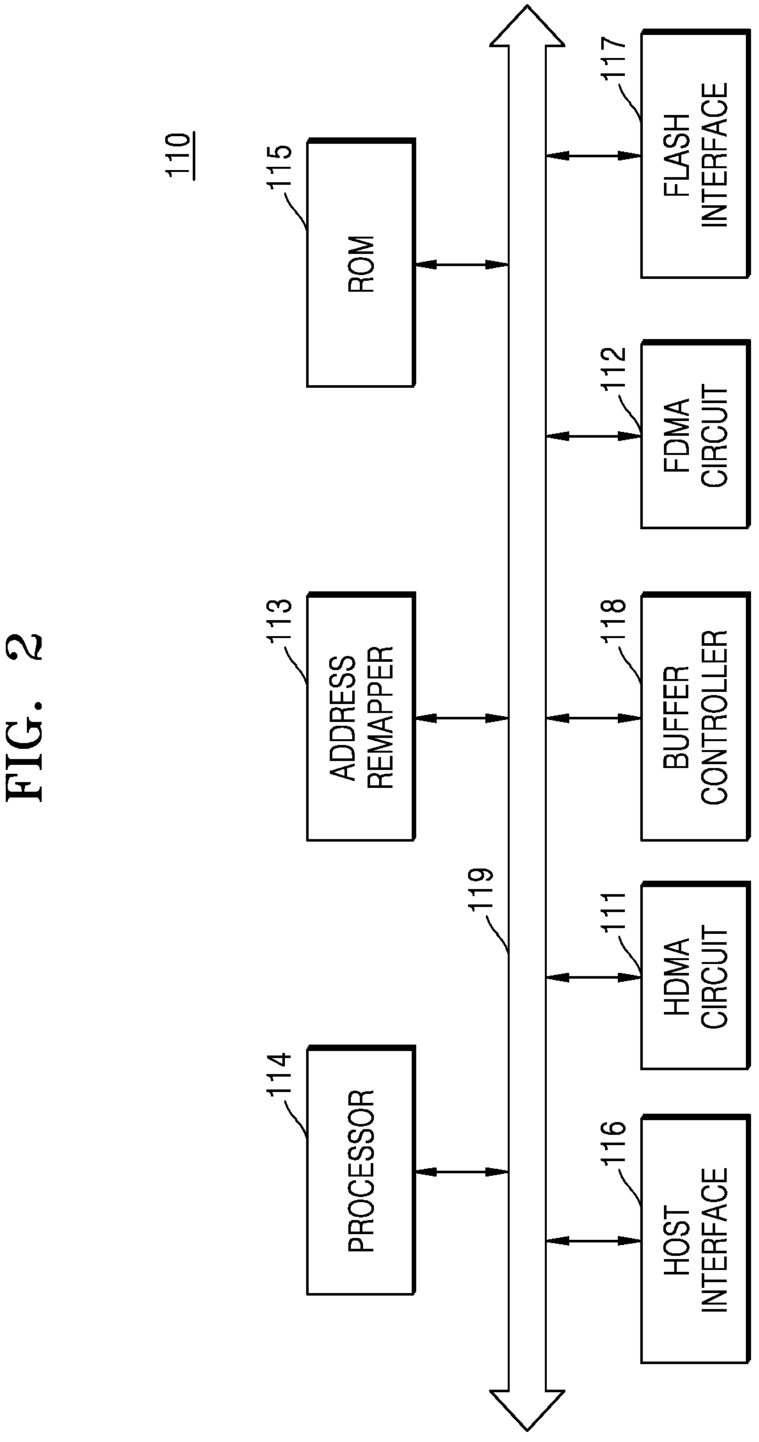
FIG. 2 is a detailed block diagram of a memory controller in FIG. 1.

FIG. 2 is a detailed block diagram of the memory controller 110 in FIG. 1.

Referring to FIGS. 1 and 2, the memory controller 110 may include the HDMA circuit 111, the FDMA circuit 112, the address remapper 113, a processor 114, ROM 115, a host interface 116, a flash interface 117, a buffer controller 118, and a system bus 119.

The HDMA circuit 111, the FDMA circuit 112, and the address remapper 113 have been described above with reference to FIG. 1, and thus, detailed descriptions thereof are omitted.

The processor 114 may be configured to generally control operations of the memory controller 110. The processor 114 may be configured to drive various software layers necessary for the memory controller 110 to operate or control various hardware components of the memory controller 110.

For example, the processor 114 may be configured to perform initial setup on the HDMA circuit 111 and the FDMA circuit 112 to perform external DMA operations and internal DMA operations. For example, the processor 114 may implement at least a part of the address remapper 113 by executing a program loaded to a working memory (not shown). In other words, a part of the address remapper 113 may be implemented by software executed by the processor 114.

The memory controller 110 may be configured to communicate with the host 200 through the host interface 116. For example, the host interface 116 may include one or more interfaces including, but not limited to, a double data rate (DDR) interface, a universal serial bus (USB) interface, a multimedia card (MMC) interface, an embedded MMC (eMMC) interface, a peripheral component interconnection (PCI) interface, a PCI express (PCIe) interface, an advanced technology attachment (ATA) interface, a serial ATA (SATA) interface, a parallel ATA (PATA) interface, a small computer system interface (SCSI), an enhanced small disk interface (ESDI), an integrated drive electronics (IDE) interface, a FireWire interface, a universal flash storage (UFS) interface, and/or an NVM express (NVMe) interface. The memory controller 110 may be configured to communicate with the NVM device 130 through the flash interface 117.

The buffer controller 118 may be configured to control the buffer memory 120. The buffer controller 118 may be configured to generate various control signals for writing data to the buffer memory 120 or reading data from the buffer memory 120 and provide the various control signals to the buffer memory 120. For example, in an external DMA operation or an internal DMA operation, the buffer controller 118 may be configured to write data to the buffer memory 120 or read data from the buffer memory 120 under control by the HDMA circuit 111 or the FDMA circuit 112. The buffer controller 118 may be configured to access a region corresponding to the physical address PA provided from the address remapper 113. In some embodiments, the address remapper 113 may be configured to directly provide the physical address PA to the buffer controller 118. In some embodiments, the address remapper 113 may provide the physical address PA to the buffer controller 118 via the HDMA circuit 111 or the FDMA circuit 112. Although the address remapper 113 and the buffer controller 118 are illustrated as separate components, embodiments are not limited thereto. In some embodiments, the address remapper 113 may be integrated with the buffer controller 118.

The system bus 119 may be configured to provide a transmission path of data, information, or a control signal between components of the memory controller 110. The system bus 119 may provide various information transmission paths, such as a data bus, an address bus, and a control bus.

For example, the HDMA circuit 111 may be configured to read data from the buffer memory 120 through the system bus 119. In other words, the HDMA circuit 111 may be configured to perform an external DMA operation through the system bus 119. The FDMA circuit 112 may be configured to provide data read from the NVM device 130 to the buffer memory 120 through the system bus 119. In other words, the FDMA circuit 112 may be configured to perform an internal DMA operation by using the system bus 119. However, embodiments of the inventive concept is not limited thereto.

Although not shown, the memory controller 110 may further include other components, such as an error correction code (ECC) engine, a randomizer, and SRAM.

For example, as shown in FIG. 1, each of the HDMA circuit 111, the FDMA circuit 112, and the address remapper 113 may be implemented in a separate hardware circuit. Although not shown, the HDMA circuit 111 and the FDMA circuit 112 may be implemented in a single hardware circuit and may separately operate according to function.

Figure 3:
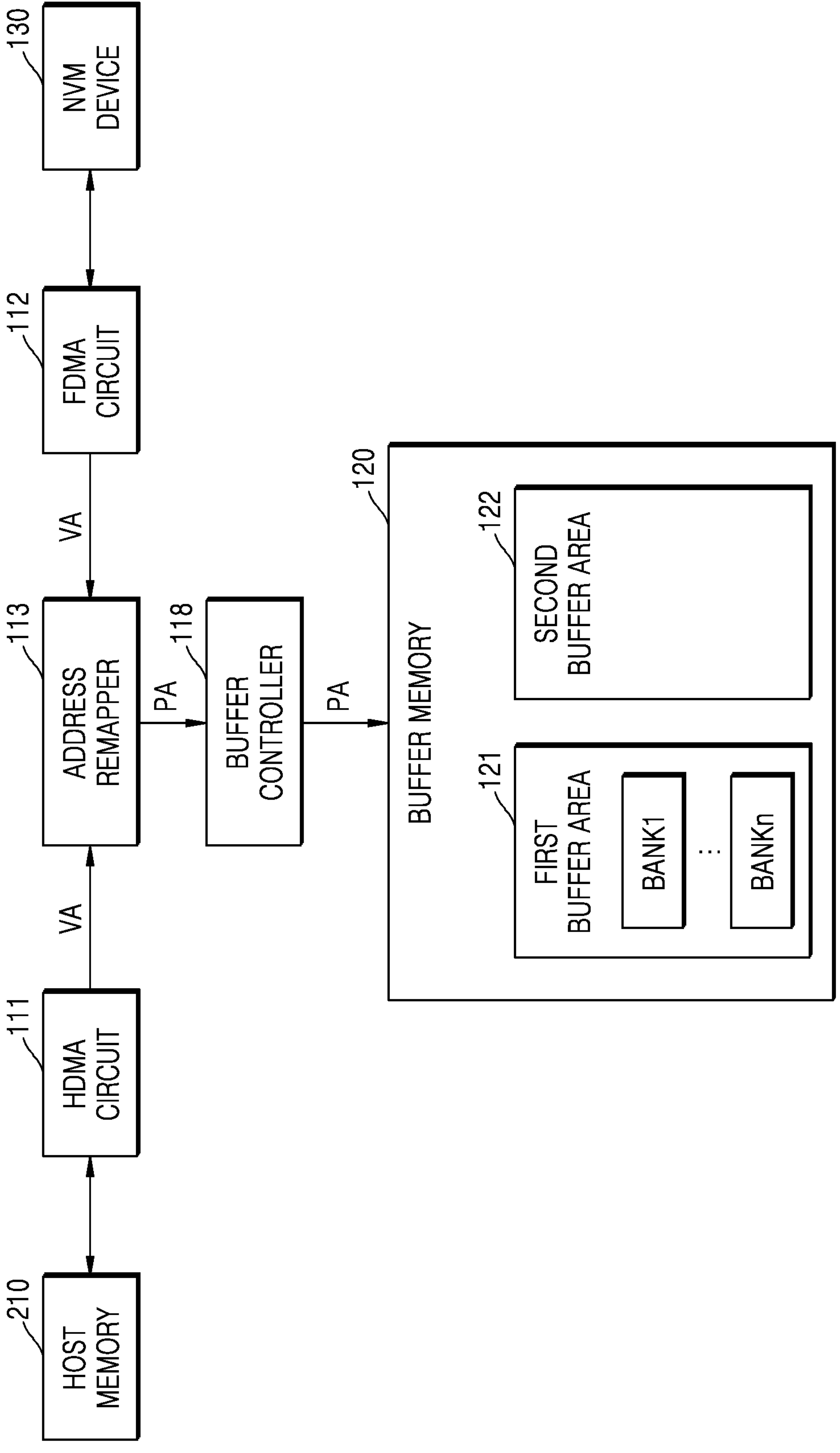
FIG. 3 is a block diagram illustrating an operation of an address remapper, according to an embodiment.

FIG. 3 is a block diagram illustrating an operation of an address remapper, according to an embodiment.

Referring to FIG. 3, the HDMA circuit 111 may be configured to control a DMA operation between the host memory 210 and the buffer memory 120, and the FDMA circuit 112 may control a DMA operation between the buffer memory 120 and the NVM device 130.

The address remapper 113 may be configured to receive the virtual address VA from the HDMA circuit 111 or the FDMA circuit 112 and configured to provide the physical address PA mapped to the virtual address VA to the buffer controller 118. In some embodiments, the address remapper 113 may be configured to provide the physical address PA to the HDMA circuit 111 or the FDMA circuit 112, and the HDMA circuit 111 or the FDMA circuit 112 may be configured to provide the physical address PA to the buffer controller 118.

The buffer controller 118 may be configured to provide the physical address PA to the buffer memory 120. Although not shown, the buffer controller 118 may be configured to receive a command or data from the HDMA circuit 111 or the FDMA circuit 112 and access the buffer memory 120 by providing the command or the data to the buffer memory 120.

The buffer memory 120 may include a first buffer area 121 and a second buffer area 122. For example, the first buffer area 121 may correspond to a DRAM area and the second buffer area 122 may correspond to an SRAM area. However, the number and kind of buffer areas of the buffer memory 120 are not limited thereto. The address remapper 113 may be configured to manage a first virtual address range mapped to the first buffer area 121 and a second virtual address range mapped to the second buffer area 122. In other words, the address remapper 113 may be configured to map the virtual address VA to a physical address of the first buffer area 121 when the virtual address VA is in the first virtual address range and may be configured to map the virtual address VA to a physical address of the second buffer area 122 when the virtual address VA is in the second virtual address range.

The first buffer area 121 may include first to n-th memory banks BANK1 to BANKn. The address remapper 113 may be configured to map the virtual address VA to the physical address PA, such that accesses by an external DMA operation and an internal DMA operation are evenly distributed among the first to n-th memory banks BANK1 to BANKn.

In detail, the address remapper 113 may be configured to count the number of virtual addresses mapped to each of the first to n-th memory banks BANK1 to BANKn and configured to map a new virtual address to a physical address of a memory bank mapped to the smallest number of virtual addresses among the first to n-th memory banks BANK1 to BANKn.

Figure 4A:
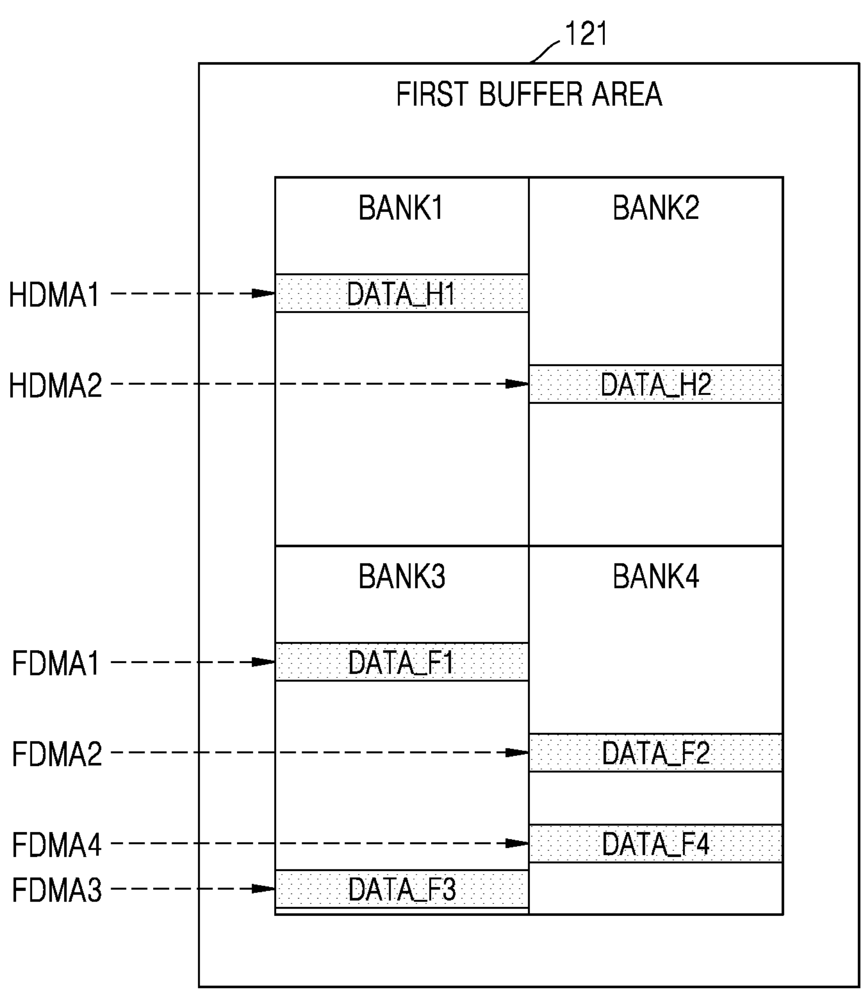
FIGS. 4A and 4B are diagrams illustrating buffer allocation according to embodiments.
Figure 4B:
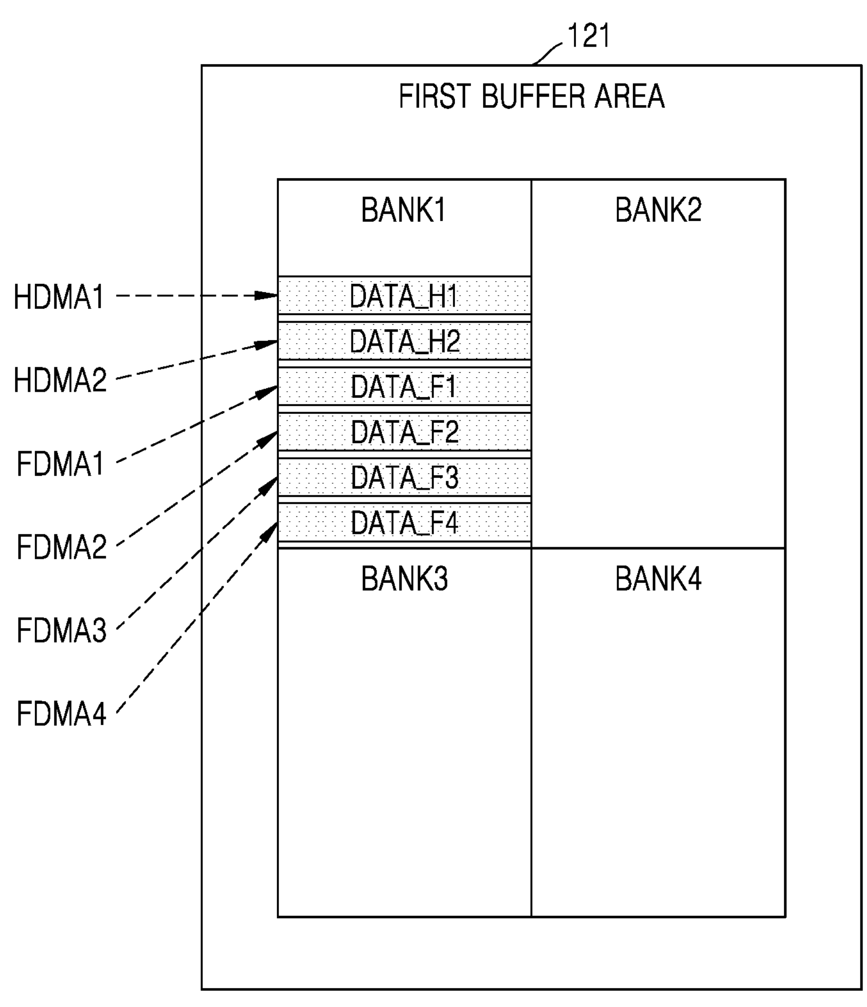

FIGS. 4A and 4B are diagrams illustrating buffer allocation according to embodiments.

Referring to FIG. 4A, each of first and second HDMA circuits HDMA1 and HDMA2 may correspond to the HDMA circuit 111 in FIGS. 1 and 2 and each of first to fourth FDMA circuits FDMA1 to FDMA4 may correspond to the FDMA circuit 112 in FIGS. 1 and 2. In other words, referring to FIGS. 4A and 4B, there may be six master IP blocks accessing the buffer memory 120. The first buffer area 121 may include first to fourth memory banks BANK1 to BANK4, but embodiments are not limited thereto. The first buffer area 121 may correspond to a DRAM area.

As shown in FIG. 4A, the first HDMA circuit HDMA1 accesses data DATA_H1 in the first memory bank BANK1. The second HDMA circuit HDMA2 accesses data DATA_H2 in the second memory bank BANK2. The first FDMA circuit FDMA1 accesses data DATA_F1 in the third memory bank BANK3. The second FDMA circuit FDMA2 accesses data DATA_F2 in the fourth memory bank BANK4. The third FDMA circuit FDMA3 accesses data DATA_F3 in the third memory bank BANK3. The fourth FDMA circuit FDMA4 accesses data DATA_F4 in the fourth memory bank BANK4. The address remapper 113 may provide the physical address PA to the buffer controller 118, such that the first HDMA circuit HDMA1 accesses the first memory bank BANK1, the second HDMA circuit HDMA2 accesses the second memory bank BANK2, the first FDMA circuit FDMA1 accesses the third memory bank BANK3, the second FDMA circuit FDMA2 accesses the fourth memory bank BANK4, the third FDMA circuit FDMA3 accesses the third memory bank BANK3, and the fourth FDMA circuit FDMA4 accesses the fourth memory bank BANK4.

Because the first to fourth memory banks BANK1 to BANK4 may operate independently, the respective operations of the first and second HDMA circuits HDMA1 and HDMA2 and the first to fourth FDMA circuits FDMA1 to FDMA4, which access the first to fourth memory banks BANK1 to BANK4, may be performed in parallel. In other words, the address remapper 113 may distribute, among a plurality of memory banks, the accesses by a plurality of master IP blocks to the buffer memory 120 and, accordingly, the speed of processing the accesses may increase.

Referring to FIG. 4B, the address remapper 113 may be configured to provide the physical address PA to the buffer controller 118, such that all of the first and second HDMA circuits HDMA1 and HDMA2 and the first to fourth FDMA circuits FDMA1 to FDMA4 access the first memory bank BANK1. In some embodiments, to store data related to the same stream identifier in the first memory bank BANK1 in the multi-stream mode, the address remapper 113 may be configured to map the virtual address VA of the data to the physical address PA of the first memory bank BANK1. In some embodiments, to store data related to the same master IP block in a certain memory bank based on the identifiers of master IP blocks, the address remapper 113 may be configured to map the virtual address VA of the data to the physical address PA of the certain memory bank. For example, the address remapper 113 may be configured to map the virtual address VA of data received from or to be provided to the first HDMA circuit HDMA1 to the physical address PA of the first memory bank BANK1.

Figure 5:
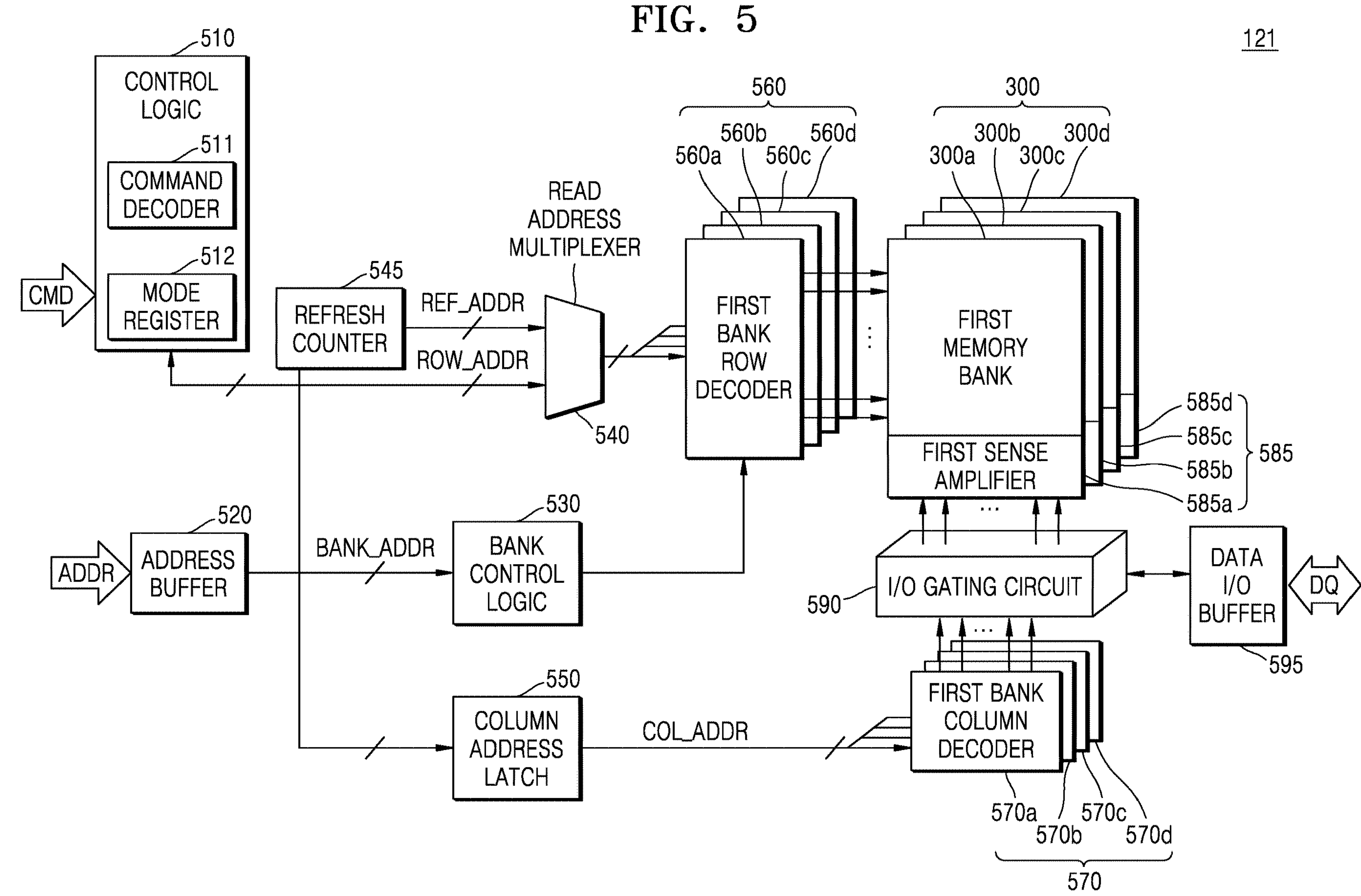
FIG. 5 is a diagram illustrating a first buffer area in FIG. 3.

FIG. 5 is a diagram illustrating the first buffer area 121 in FIG. 3.

Referring to FIG. 5, the first buffer area 121 may include a control logic circuit 510, an address buffer 520, a bank control logic 530, a row address multiplexer 540, a column address latch 550, a row decoder 560, a column decoder 570, a memory bank 300, a sense amplifier unit 585, an input/output (I/O) gating circuit 590, a data I/O buffer 595, and a refresh counter 545.

The memory bank 300 may include first to fourth memory banks 300*a* to 300*d*. The row decoder 560 may include first to fourth bank row decoders 560*a* to 560*d* respectively connected to the first to fourth memory banks 300*a* to 300*d*. The column decoder 570 may include first to fourth bank column decoders 570*a* to 570*d* respectively connected to the first to fourth memory banks 300*a* to 300*d*. The sense amplifier unit 585 may include first to fourth sense amplifiers 585*a* to 585*d* respectively connected to the first to fourth memory banks 300*a* to 300*d*. Each of the first to n-th memory banks BANK1 to BANKn in FIG. 3 may correspond to at least one of the first to fourth memory banks 300*a* to 300*d*.

The first to fourth memory banks 300*a* to 300*d*, the first to fourth sense amplifiers 585*a* to 585*d*, the first to fourth bank column decoders 570*a* to 570*d*, and the first to fourth bank row decoders 560*a* to 560*d* may form first to fourth banks. Each of the first to fourth memory banks 300*a* to 300*d* may include a plurality of word lines, a plurality of bit lines, and a plurality of memory cells respectively formed at the intersections between the word lines and the bit lines.

Although FIG. 5 shows an example of the first buffer area 121 including four memory banks, the first buffer area 121 may include any number of memory banks according to various embodiments.

The address buffer 520 may be configured to receive an address ADDR, which includes a bank address BANK_ADDR, a row address ROW_ADDR, and a column address COL_ADDR, from the buffer controller 118. The address buffer 520 may provide the bank address BANK_ADDR to the control logic 530, the row address ROW_ADDR to the row address multiplexer 540, and the column address COL_ADDR to the column address latch 550. According to an embodiment, the address ADDR may correspond to the physical address PA provided by the address remapper 113 in FIGS. 1 to 3.

The bank control logic 530 may be configured to generate bank control signals in response to the bank address BANK_ADDR. In response to the bank control signals, a bank row decoder corresponding to the bank address BANK_ADDR among the first to fourth bank row decoders 560*a* to 560*d* may be activated and a bank column decoder corresponding to the bank address BANK_ADDR among the first to fourth bank column decoders 570*a* to 570*d* may be activated.

The row address multiplexer 540 may be configured receive the row address ROW_ADDR from the address buffer 520 and a refresh row address REF_ADDR from the refresh counter 545. The row address multiplexer 540 may be configured to selectively output the row address ROW_ADDR or the refresh row address REF_ADDR as a row address. The row address output from the row address multiplexer 540 may be applied to each of the first to fourth bank row decoders 560*a* to 560*d*.

Among the first to fourth bank row decoders 560*a* to 560*d*, the bank row decoder activated by the bank control logic 530 may be configured to decode the row address output from the row address multiplexer 540 and configured to activate a word line corresponding to the row address. For example, the activated bank row decoder may apply a word line drive voltage to the word line corresponding to the row address. The activated bank row decoder may be configured to generate the word line drive voltage by using a power supply voltage and provide the word line drive voltage to the word line corresponding to the row address.

The column address latch 550 may be configured to receive the column address COL_ADDR from the address buffer 520 and temporarily store the column address COL_ADDR or a mapped column address. The column address latch 550 may gradually increase the column address COL_ADDR in a burst mode. The column address latch 550 may be configured to apply, to each of the first to fourth bank column decoders 570*a* to 570*d*, the column address COL_ADDR that has been temporarily stored or gradually increased.

Among the first to fourth bank column decoders 570*a* to 570*d*, the bank column decoder activated by the bank control logic 530 may be configured to activate a sense amplifier, which corresponds to the bank address BANK_ADDR and the column address COL_ADDR among the first to fourth sense amplifiers 585*a* to 585*d*, through the I/O gating circuit 590.

The I/O gating circuit 590 may include various functional circuits configured to perform specific operations including, but not limited to, circuits gating I/O data, an input data masking logic, read data latches storing data output from the first to fourth memory banks 300*a* to 300*d*, and write drivers writing data to the first to fourth memory banks 300*a* to 300*d*.

Data output from a memory bank among the first to fourth memory banks 300*a* to 300*d* may be sensed by a sense amplifier corresponding to the memory bank and stored in the read data latches.

The data stored in the read data latches may be provided to the memory controller 110 through the data I/O buffer 595. A data set DQ to be written to one of the first to fourth memory banks 300*a* to 300*d* may be provided from the memory controller 110 to the data I/O buffer 595. The data set DQ provided to the data I/O buffer 595 may be provided to the I/O gating circuit 590.

The control logic circuit 510 may be configured to control operations of the first buffer area 121. For example, the control logic circuit 510 may be configured to generate control signals so that the first buffer area 121 performs a write operation or a read operation. The control logic circuit 510 may include a command decoder 511, which decodes a command CMD received from the memory controller 110, and a mode register 512, which sets an operation mode of the first buffer area 121.

Figure 6:
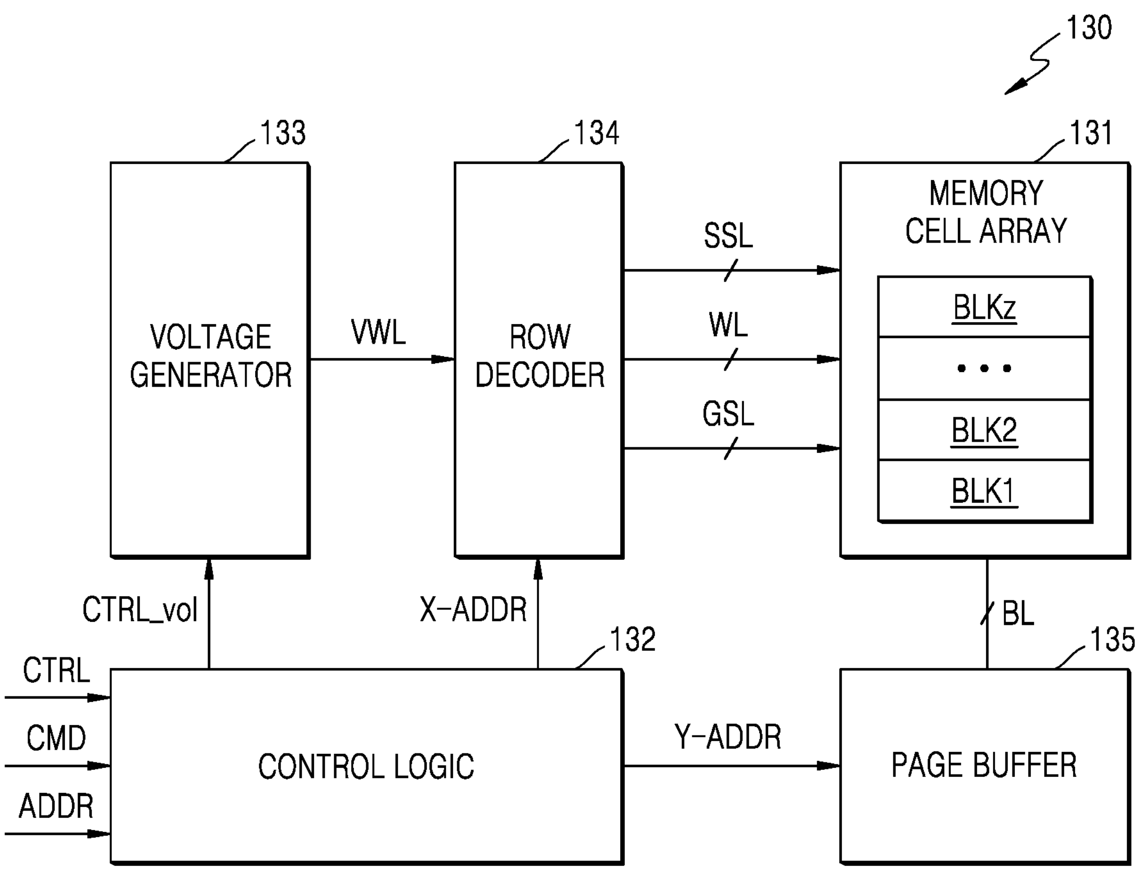
FIG. 6 is a block diagram of an example implementation of a non-volatile memory (NVM) device in FIG. 1.

FIG. 6 is a block diagram of an example implementation of the NVM device 130 in FIG. 1.

Referring to FIG. 6, the NVM device 130 may include a memory cell array 131, a control logic 132, a voltage generator 133, a row decoder 134, and a page buffer 135. Although not shown, the NVM device 130 may further include other various components, such as a data I/O circuit and an I/O interface, which are related to memory operations.

The memory cell array 131 may include a plurality of blocks BLK1 to BLKz. The memory cells of the blocks BLK1 to BLKz may be connected to word lines WL, string select lines SSL, ground select lines GSL, and bit lines BL. The memory cell array 131 may be connected to the row decoder 134 through the word lines WL, the string select lines SSL, and the ground select lines GSL and connected to the page buffer 135 through the bit lines BL. Each memory cell may store one or more bits and correspond to a single-level cell (SLC), a multi-level cell (MLC), a triple-level cell (TLC), or a quadruple-level cell (QLC).

In an embodiment, the memory cell array 131 may include a two-dimensional (2D) memory cell array, which may include a plurality of cell strings in row and column directions. According to an embodiment, the memory cell array 131 may include a three-dimensional (3D) memory cell array, which may include a plurality of cell strings, wherein each cell string may include memory cells respectively connected to word lines vertically stacked on a substrate. Structures of a 3D memory cell array, in which the 3D memory cell array includes a plurality of levels and word lines and/or bit lines are shared by levels, are disclosed in U.S. Pat. Nos. 7,679,133, 8,553,466, 8,654,587, 8,559,235, and U.S. Patent Application No. 2011/0233648, the disclosures of which are incorporated herein in their entireties, respectively, by reference.

The control logic 132 may be configured to output various internal control signals for programming data to the memory cell array 131 or reading data from the memory cell array 131, based on a command CMD, an address ADDR, and a control signal CTRL which are received from the memory controller 110. For example, the control logic 132 may be configured to output a voltage control signal CTRL_vol for controlling the levels of various voltages generated by the voltage generator 133 and configured to provide a row address X-ADDR to the row decoder 134 and a column address Y_ADDR to the page buffer 135.

Based on the voltage control signal CTRL_vol, the voltage generator 133 may be configured to generate various voltages for performing program, read, and erase operations on the memory cell array 131. In detail, the voltage generator 133 may be configured to generate a word line voltage VWL, e.g., a program voltage, a read voltage, or a program verify voltage. In response to the row address X-ADDR, the row decoder 134 may be configured to select one of the word lines WL and configured to select one of the string select lines SSL. In response to the column address Y_ADDR, the page buffer 135 may be configured to select some of the bit lines BL. The page buffer 135 may be configured to operate as a write driver or a sense amplifier according to the operation mode.

During an internal DMA operation, the NVM device 130 may be configured to perform a read operation, a program operation, or an erase operation based on a command, an address, or data, which is provided from the FDMA circuit 112.

Figure 7:
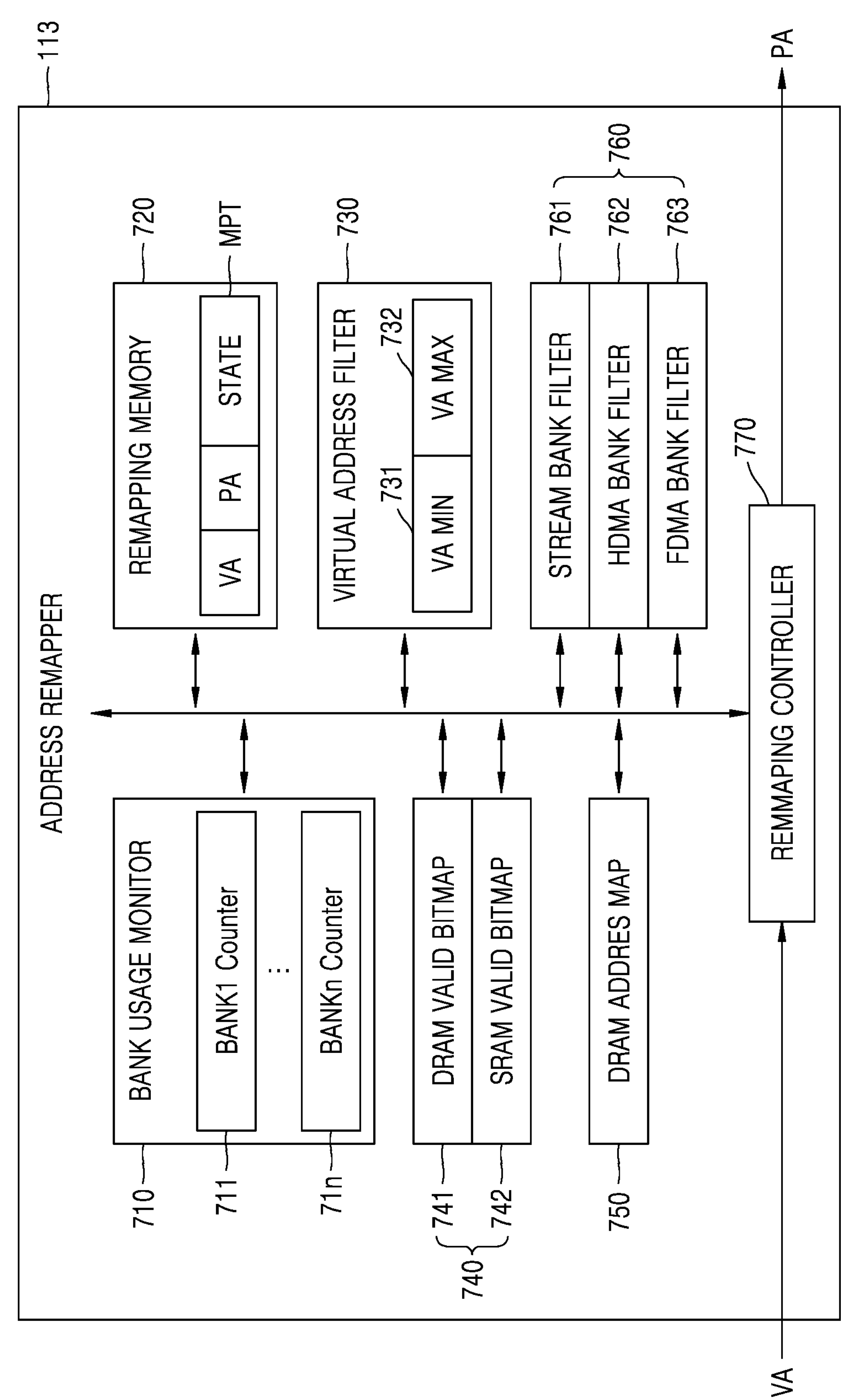
FIG. 7 is a block diagram illustrating an address remapper according to an embodiment.
Figure 8:
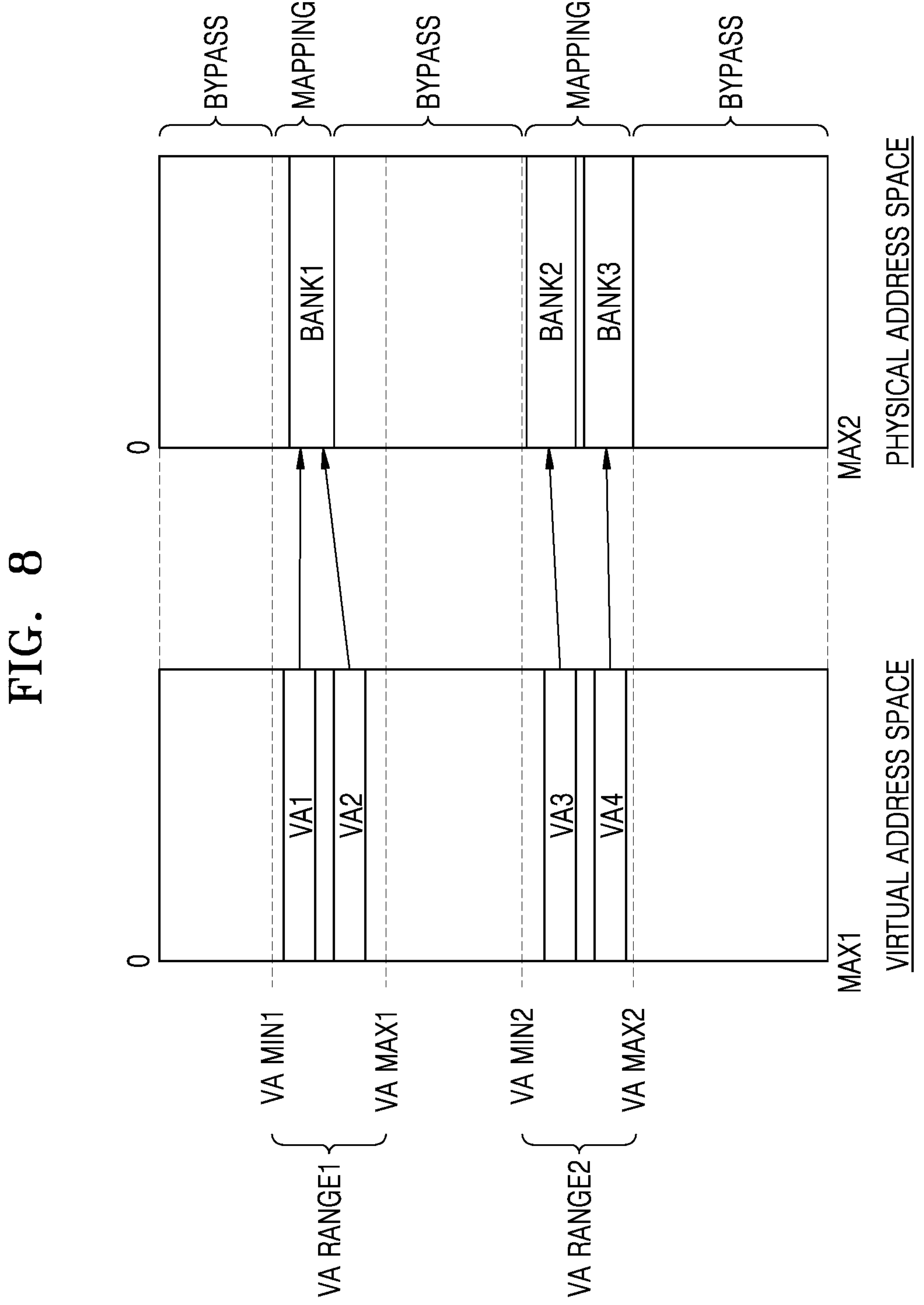
FIG. 8 is a diagram illustrating virtual address space and physical address space, according to an embodiment.

FIG. 7 is a block diagram illustrating the address remapper 113 according to an embodiment. FIG. 8 is a diagram illustrating virtual address space and physical address space, according to an embodiment. FIG. 9 is a diagram illustrating a DRAM valid bitmap according to an embodiment.

Referring to FIG. 7, the address remapper 113 may include a bank usage monitor 710, a remapping memory 720, a virtual address filter 730, a valid bitmap 740, a DRAM address map 750, a bank filter 760, and a remapping controller 770.

The remapping controller 770 may be configured to receive the virtual address VA from the HDMA circuit 111 or the FDMA circuit 112 and configured to provide the physical address PA to the buffer controller 118. The remapping controller 770 may generally control the address remapper 113.

The bank usage monitor 710 may be configured to monitor a count value which indicates the number of virtual addresses mapped to each of the first to n-th memory banks BANK1 to BANKn in FIG. 3. In detail, the bank usage monitor 710 may include first to n-th memory bank counters 711 to 71*n*. The first memory bank counter 711 may be configured to count the number of virtual addresses mapped to the first memory bank BANK1 and the n-th memory bank counter 71*n* may be configured to count the number of virtual addresses mapped to the n-th memory bank BANKn. In detail, the virtual address VA may be mapped to the physical address PA of a storage area (e.g., a page) in a memory bank. A page may be a unit including cells connected to a single word line. The virtual address VA may be mapped to the physical address PA of at least one page. For example, the virtual address VA may be mapped to the physical address PA of a storage area of 4 KB, 8 KB, or 16 KB, but embodiments are not limited thereto.

Upon receiving the virtual address VA, the remapping controller 770 may be configured to select a memory bank counter storing the smallest count value among the first to n-th memory bank counters 711 to 71*n* and map the virtual address VA to a memory bank corresponding the selected memory bank counter. When the virtual address VA is mapped to the memory bank, the count value of the memory bank counter corresponding to the memory bank may increase by 1. The operation of mapping the virtual address VA to the physical address PA of the buffer memory 120 may be referred to as buffer allocation. For example, in a write operation in which write data of the host memory 210 is stored in the NVM device 130, the write data may be temporarily stored in the buffer memory 120 and then transmitted to the NVM device 130. To temporarily store the write data in the buffer memory 120, buffer allocation may be performed on the virtual address VA related to the write data. Although the write operation has been described, buffer allocation may also be performed on the virtual address VA related to read data, which has been read from the NVM device 130, to temporarily store the read data in the buffer memory 120.

When buffer deallocation is performed, the counter value of a memory bank counter may be decreased by the number of deallocated virtual addresses. During the buffer deallocation, the mapping relationship between the virtual address VA and the physical address PA may be initialized.

The remapping memory 720 may be configured to store a mapping table MPT. The mapping table MPT may include at least one entry representing the mapping relationship between the virtual address VA and the physical address PA. Each entry may store the virtual address VA, the physical address PA, and a state of the mapping relationship therebetween.

During buffer allocation, the remapping controller 770 may be configured to map the virtual address VA to the physical address PA and store the virtual address VA, the physical address PA, and a state about the mapping relationship therebetween in the mapping table MPT. In other words, in case of a mapping hit, the entry may be added to the mapping table MPT. The state of a page indicated by the virtual address VA may be recorded in a state field. For example, when the virtual address VA is newly allocated by the HDMA circuit 111, "Newly Allocated" may be recorded in the state field. When data of a page corresponding to the virtual address VA is accessed by the FDMA circuit 112, "Read Finished" may be recorded in the state field. However, information recorded in the state field is not limited to these examples. During buffer deallocation, the remapping controller 770 may be configured to delete, from the mapping table MPT, an entry that is a target of deallocation.

The virtual address filter 730 may be configured to store a range of virtual addresses mapped to physical addresses. In detail, the virtual address filter 730 may include a minimum register 731, which stores a minimum virtual address value VA MIN, and a maximum register 732, which stores a maximum virtual address value VA MAX. The remapping controller 770 may be configured to determine whether the virtual address VA received from the HDMA circuit 111 or the FDMA circuit 112 is in a virtual address range defined by the virtual address filter 730. The virtual address range may be greater than or equal to 2. The minimum virtual address value VA MIN and the maximum virtual address value VA MAX may be set when or after the storage device 100 is booted. To set the minimum virtual address value VA MIN and the maximum virtual address value VA MAX after the booting is completed, the remapping controller 770 may be configured to delete all entries in the mapping table MPT.

For example, referring to FIG. 8, the virtual address space may include virtual addresses from 0 to a first maximum value MAX1. When the virtual address VA is in a first virtual address range VA RANGE1 or a second virtual address range VA RANGE2 in the virtual address space, the virtual address VA may be mapped to the physical address PA in the physical address space. The first virtual address range VA RANGE1 may be defined by a first minimum virtual address value VA MIN1 and a first maximum virtual address value VA MAX1, and the second virtual address range VA RANGE2 may be defined by a second minimum virtual address value VA MIN2 and a second maximum virtual address value VA MAX2. The physical address space may include physical addresses from 0 to a second maximum value MAX2. The first maximum value MAX1 may be different from the second maximum value MAX2. When the virtual address VA is not in the first virtual address range VA RANGE1 or the second virtual address range VA RANGE2 in the virtual address space, the virtual address VA may be used as the physical address PA as the virtual address VA is without mapping. In other words, the virtual address VA may bypass mapping. For example, the virtual address VA between 0 and the first minimum virtual address value VA MIN1 may bypass mapping and thus be used as the physical address PA.

Referring to FIG. 7, the valid bitmap 740 may include a DRAM valid bitmap 741 and an SRAM valid bitmap 742. The DRAM valid bitmap 741 and the SRAM valid bitmap 742 may indicate allocability of each storage unit (e.g., each page). For example, the DRAM valid bitmap 741 and the SRAM valid bitmap 742 may indicate allocability of each storage unit of 4 KB. For example, referring to FIG. 9, the DRAM valid bitmap 741 may indicate whether each of a plurality of pages, e.g., first to n-th pages PAGE1 to PAGEn, included in each of the first to n-th memory banks BANK1 to BANKn is allocable. Here, "1" may indicate that allocation is allowed and "0" may indicate that allocation is not allowed. However, embodiments are not limited thereto. When the virtual address VA is mapped to the physical address PA of the first page PAGE1 of the second memory bank BANK2, a bit indicating whether the first page PAGE1 of the second memory bank BANK2 is allocable may be changed to "0". During buffer deallocation, the bit for a deallocated page may be changed to "1".

The DRAM address map 750 may include mapping information for extracting the virtual address VA from a signal provided from the HDMA circuit 111 or the FDMA circuit 112 to a bus (e.g., the bus 119 in FIG. 2). For example, the HDMA circuit 111 or the FDMA circuit 112 may be configured to provide 32 to 35 bits of data to the bus, and the remapping controller 770 may be configured to extract the virtual address VA based on bits specified by the DRAM address map 750. The mapping information stored in the DRAM address map 750 may be set at boot time.

The bank filter 760 may be configured to store physical addresses of a certain memory bank. Based on the bank filter 760, the remapping controller 770 may be configured to map the virtual address VA to the physical address PA of a certain memory bank. A stream bank filter 761 may be configured to store physical addresses of a first memory bank. The remapping controller 770 may be configured to map virtual addresses related to the same stream identifier to a physical address of the first memory bank. An HDMA bank filter 762 may be configured to store physical addresses of a second memory bank. Based on the HDMA bank filter 762, the remapping controller 770 may be configured to map the virtual address VA received from the HDMA circuit 111 to a physical address of the second memory bank. An FDMA bank filter 763 may be configured to store a physical address of a third memory bank. Based on the FDMA bank filter 763, the remapping controller 770 may map the virtual address VA received from the FDMA circuit 112 to a physical address of the third memory bank.

Referring to FIG. 8, the remapping controller 770 may be configured to map a first virtual address VA1 and a second virtual address VA2 to a physical address of the first memory bank BANK1, based on the stream bank filter 761. The remapping controller 770 may be configured to map a third virtual address VA3 to a physical address of the second memory bank BANK2 based on the HDMA bank filter 762. The remapping controller 770 may be configured to map a fourth virtual address VA4 to a physical address of the third memory bank BANK3 based on the FDMA bank filter 763.

Figure 10:
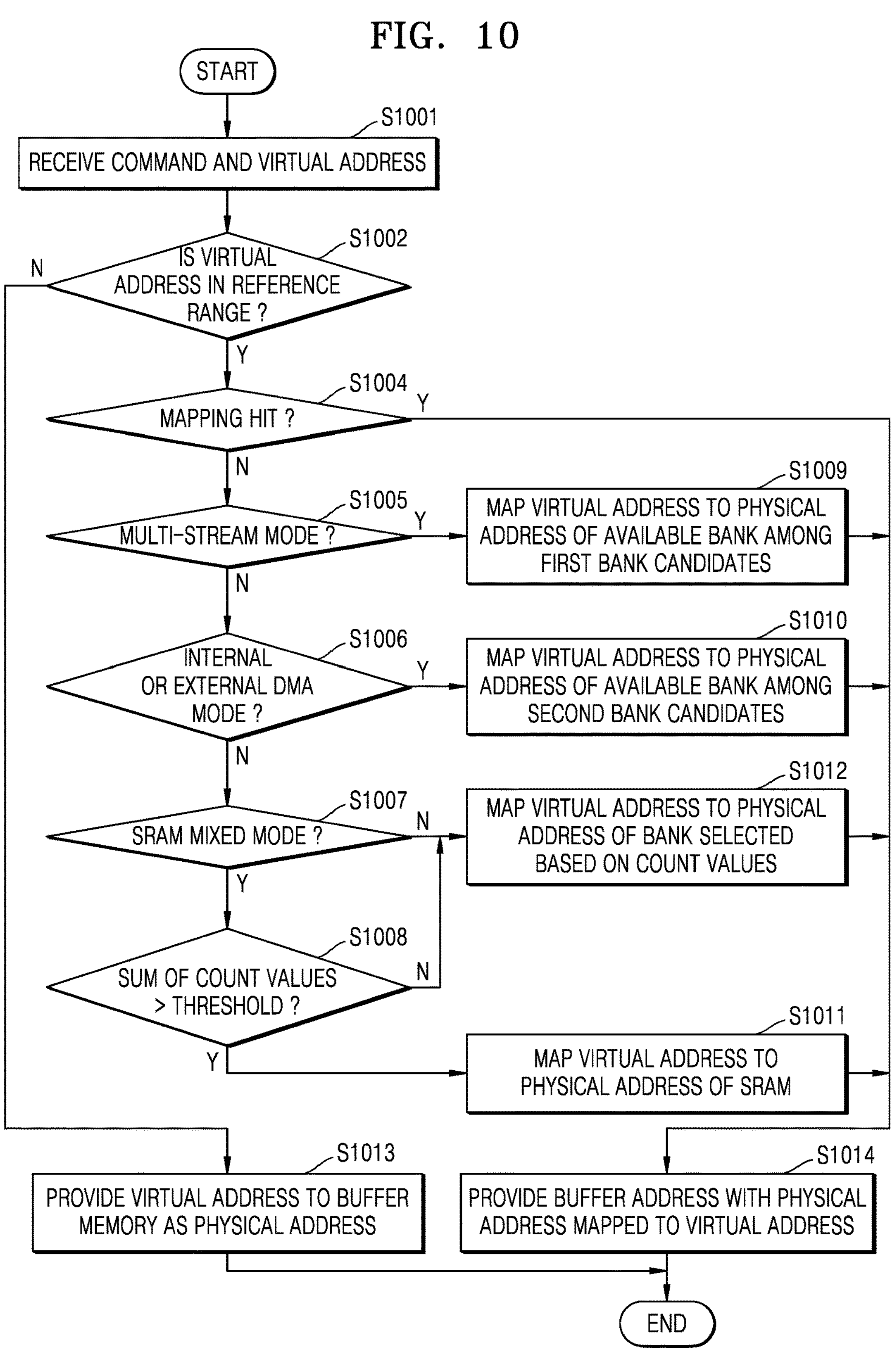
FIG. 10 is a flowchart of an operating method of an address remapper, according to an embodiment.

FIG. 10 is a flowchart of an operating method of an address remapper, according to an embodiment. FIG. 10 is described with reference to FIGS. 1 and 7.

The address remapper 113 may receive a command and a virtual address from the HDMA circuit 111 or the FDMA circuit 112 in operation S1001. The command may include a write command or a read command.

The address remapper 113 may identify whether the virtual address is in a reference range based on the virtual address filter 730 in operation S1002. The reference range may be between the minimum virtual address value VA MIN and the maximum virtual address value VA MAX.

When the virtual address is not in the reference range (i.e., S1002=N), the address remapper 113 may bypass the virtual address and provide the virtual address to the buffer memory 120 as a physical address in operation S1013.

Otherwise, when the virtual address is in the reference range (i.e., S1002=Y), the address remapper 113 may identify whether there is a mapping hit based on the mapping table MPT of the remapping memory 720 in operation S1004. When an entry in which the virtual address is recorded is included in the mapping table MPT, it may be a mapping hit. Otherwise, when there is no entry in which the virtual address is recorded in the mapping table MPT, it may be a mapping miss.

In case of mapping hit (i.e., S1004=Y), the address remapper 113 may provide the buffer memory 120 with a physical address mapped to the virtual address based on the mapping table MPT, in operation S1014.

In case of mapping miss (i.e., S1004=N), the address remapper 113 may identify the operation mode of the storage device 100. For example, the address remapper 113 may identify whether the operation mode is the multi-stream mode in operation S1005, identify whether the operation mode is the internal DMA mode or the external DMA mode in operation S1006, and identify whether the operation mode is an SRAM mixed mode in operation S1007. Although it has been described that the multi-stream mode, the internal or external DMA mode, and the SRAM mixed mode are sequentially identified, embodiments are not limited thereto.

The address remapper 113 may identify whether the storage device 100 operates in the multi-stream mode in operation S1005. In detail, when a write or read operation is performed on the NVM device 130 based on a stream identifier, the address remapper 113 may identify that the storage device 100 operates in the multi-stream mode.

When the storage device 100 operates in the multi-stream mode (i.e., S1005=Y), the address remapper 113 may map the virtual address to a physical address of an available memory bank among first candidate banks corresponding to the stream identifier in operation S1009. In detail, the first candidate banks may correspond to the stream identifier and may be determined by the stream bank filter 761. In some embodiments, the address remapper 113 may select, as the available memory bank, a first candidate bank having the smallest count value among the first candidate banks, based on the bank usage monitor 710. The address remapper 113 may provide the buffer memory 120 with the physical address mapped to the virtual address in operation S1014.

Otherwise, when the storage device 100 does not operate in the multi-stream mode (i.e., S1005=N), the address remapper 113 may identify whether the storage device 100 operates in the internal DMA mode or the external DMA mode in operation S1006. In the internal DMA mode, only the DMA operation by the FDMA circuit 112 may be performed. In the external DMA mode, only the DMA operation by the HDMA circuit 111 may be performed. In other words, when the FDMA circuit 112 and the HDMA circuit 111 sequentially perform a DMA operation on the same data, the operation mode may be neither the internal DMA mode nor the external DMA mode.

When the storage device 100 operates in the internal or external DMA mode (i.e., S1006=Y), the address remapper 113 may map the virtual address to a physical address of an available memory bank among second candidate banks, in operation S1010. In detail, the second candidate banks may be memory banks determined by the HDMA bank filter 762 or the FDMA bank filter 763. In some embodiments, the address remapper 113 may select, as the available memory bank, a second candidate bank having the smallest count value among the second candidate banks, based on the bank usage monitor 710. The address remapper 113 may provide the buffer memory 120 with the physical address mapped to the virtual address, in operation S1014.

Otherwise, when the storage device 100 does not operate in either the internal DMA mode or the external DMA mode (i.e., S1006=N), the address remapper 113 may identify whether the storage device 100 operates in the SRAM mixed mode, in operation S1007. In the SRAM mixed mode, the buffer memory 120 may include SRAM as well as DRAM and may also store data in SRAM. When the storage device 100 is not in the SRAM mixed mode, the buffer memory 120 may include only DRAM but not SRAM or may use only DRAM although the buffer memory 120 includes SRAM.

When the storage device 100 does not operate in the SRAM mixed mode (i.e., S1007=N), the address remapper 113 may select a memory bank based on the count values of the bank usage monitor 710 and may map the virtual address to a physical address of the selected memory bank, in operation S1012. In detail, the address remapper 113 may select a memory bank having the smallest count value. The address remapper 113 may provide the buffer memory 120 with the physical address mapped to the virtual address in operation S1014.

Otherwise, when the storage device 100 operates in the SRAM mixed mode (i.e., S1007=Y), the address remapper 113 may compare a threshold with the sum of the count values of the memory banks in the bank usage monitor 710, in operation S1008.

When the sum of count values is less than or equal to the threshold (i.e., S1008=N), the address remapper 113 may select a memory bank having the smallest count value and map the virtual address to a physical address of the selected memory bank, in operation S1012. The address remapper 113 may provide the buffer memory 120 with the physical address mapped to the virtual address, in operation S1014.

Otherwise, when the sum of count values exceeds the threshold (i.e., S1008=Y), the address remapper 113 may map the virtual address to a physical address of not DRAM but SRAM in operation S1011. The address remapper 113 may provide the buffer memory 120 with the physical address mapped to the virtual address, in operation S1014.

Figure 11:
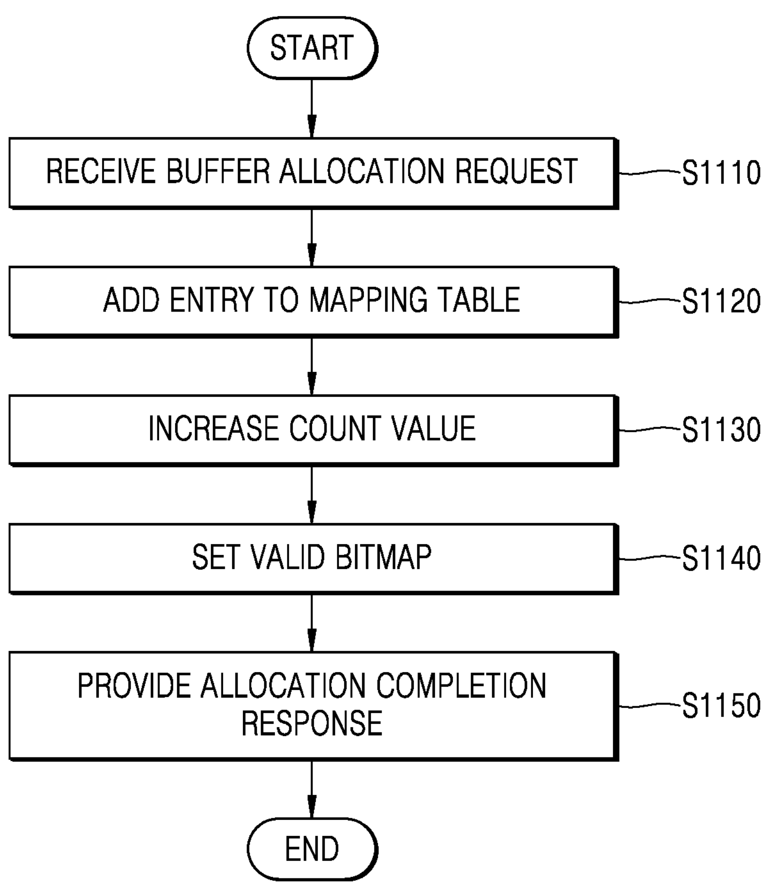
FIG. 11 is a flowchart of buffer allocation performed by an address remapper, according to an embodiment.

FIG. 11 is a flowchart of buffer allocation performed by an address remapper, according to an embodiment. FIG. 11 may be described with reference to FIG. 7 below.

The address remapper 113 may receive a virtual address and a buffer allocation request in operation S1110.

The address remapper 113 may update the mapping table MPT in the remapping memory 720 by adding an entry, in which the virtual address and a physical address are recorded, to the mapping table MPT in operation S1120.

The address remapper 113 may increase the count value of a memory bank counter, which corresponds to a memory bank including a page corresponding to the physical address mapped to the virtual address, among the first to n-th memory bank counters 711 to 71*n* of the bank usage monitor 710, in operation S1130.

The address remapper 113 may update the valid bitmap 740, such that a bit, which corresponds to the page corresponding to the physical address mapped to the virtual address, in the DRAM valid bitmap 741 and the SRAM valid bitmap 742 of the valid bitmap 740, indicates that the page is unallocable, in operation S1140.

The address remapper 113 may provide an allocation completion response in operation S1150.

Figure 12:
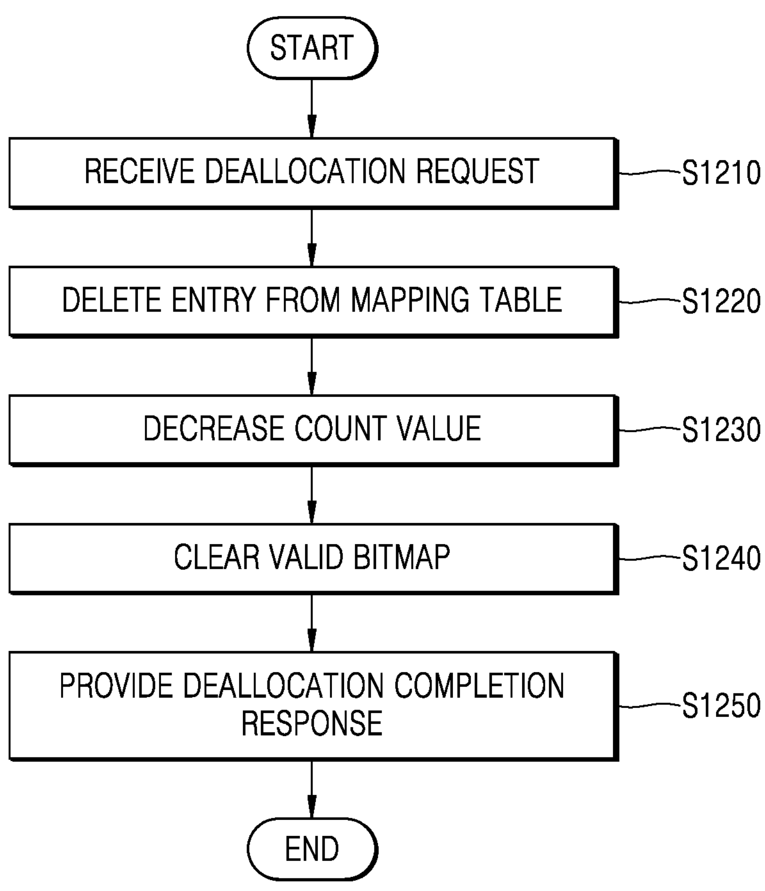
FIG. 12 is a flowchart of buffer deallocation performed by an address remapper, according to an embodiment.

FIG. 12 is a flowchart of buffer deallocation performed by an address remapper, according to an embodiment. FIG. 12 may be described with reference to FIG. 7 below.

The address remapper 113 may receive a virtual address and a deallocation request in operation S1210.

The address remapper 113 may update the mapping table MPT in the remapping memory 720 by deleting an entry, in which the virtual address is recorded, from the mapping table MPT in operation S1220.

The address remapper 113 may decrease the count value of a memory bank counter, which corresponds to a memory bank including a page corresponding to the physical address recorded in the deleted entry, among the first to n-th memory bank counters 711 to 71*n* of the bank usage monitor 710, in operation S1230.

The address remapper 113 may update the valid bitmap 740, such that a bit, which corresponds to the page corresponding to the physical address recorded in the deleted entry, in the DRAM valid bitmap 741 and the SRAM valid bitmap 742 of the valid bitmap 740, indicates that the page is allocable, in operation S1240.

The address remapper 113 may provide a deallocation completion response in operation S1250.

While the inventive concept has been particularly shown and described with reference to embodiments thereof, it will be understood that various changes in form and details may be made therein without departing from the spirit and scope of the following claims.

What is claimed is:

1. A storage device comprising:

a buffer memory including a plurality of memory banks;

a first direct memory access (DMA) circuit configured to provide data from a host to the buffer memory or data stored in the buffer memory to the host and output a first virtual address;

a second DMA circuit configured to provide data read from a non-volatile memory to the buffer memory or the data stored in the buffer memory to the non-volatile memory and output a second virtual address;

an address translation circuit configured to:

receive the first or second virtual address;

determine whether the first or second virtual address is included in a reference range;

translate, based on a count value of virtual addresses allocated to each of the plurality of memory banks, the first or second virtual address into a physical address when the first or second virtual address is included in the reference range; and skip translation when the first or second virtual address is not included in the reference range; and a buffer controller configured to access the buffer memory based on the physical address or the first or second virtual address that is not included in the reference range.

2. The storage device of claim 1, wherein the address translation circuit is further configured to select a memory bank having the physical address corresponding to the first or second virtual address based on the count value of virtual addresses allocated to each of the plurality of memory banks.

3. The storage device of claim 1, wherein the buffer memory further includes:

a dynamic random access memory (DRAM) area including the plurality of memory banks; and a static RAM (SRAM) area, and wherein the address translation circuit is further configured to map the first or second virtual address to a physical address of the SRAM area when a total count value of virtual addresses allocated to the plurality of memory banks exceeds a threshold.

4. The storage device of claim 2, wherein the address translation circuit is further configured to map the first or second virtual address to a physical address of a memory bank to which a smallest count value of virtual addresses are allocated among the plurality of memory banks.

5. The storage device of claim 1, wherein the address translation circuit is further configured to map the first or second virtual address to a physical address of a first memory bank among the plurality of memory banks based on a stream identifier provided from the host.

6. The storage device of claim 1, wherein the address translation circuit is further configured to map the first virtual address to a physical address of a second memory bank among the plurality of memory banks when the address translation circuit receives the first virtual address.

7. The storage device of claim 6, wherein the address translation circuit is further configured to map the second virtual address to a physical address of a third memory bank among the plurality of memory banks when the address translation circuit receives the second virtual address.

8. The storage device of claim 1, wherein the address translation circuit is further configured to store a bitmap indicating whether physical addresses of a plurality of storage areas in each of the plurality of memory banks are allocable to the first virtual address or the second virtual address.

9. The storage device of claim 1, wherein the address translation circuit includes a plurality of counters each configured to store, as the count value of virtual addresses allocated to each of the plurality of memory banks, a number of virtual addresses allocated to a corresponding one among the plurality of memory banks, wherein the count value of a counter corresponding to a fourth memory bank among the plurality of memory banks is increased when the first or second virtual address is mapped to a physical address of the fourth memory bank, and wherein the count value of a counter corresponding to a fifth memory bank among the plurality of memory banks is decreased when the first or second virtual address is deallocated from a physical address of the fifth memory bank.

10. An operating method of a storage device, the operating method comprising:

receiving a first virtual address from a first direct memory access (DMA) circuit or a second virtual address from a second DMA circuit;

determining a count value of virtual addresses allocated to each of a plurality of memory banks;

translating the first or second virtual address into a physical address of one of the plurality of memory banks included in a first storage area of a buffer memory based on the determined count value of virtual addresses allocated to each of the plurality of memory banks; and writing or reading data to or from the buffer memory based on the physical address.

11. The operating method of claim 10, wherein the translating of the first or second virtual address into the physical address includes:

determining whether the first or second virtual address is included in a reference range;

translating the first or second virtual address into the physical address based on a mapping table between virtual addresses and physical addresses when the first or second virtual address is included in the reference range; and bypassing translation of the first or second virtual address when the first or second virtual address is not included in the reference range.

12. The operating method of claim 10, wherein the translating of the first or second virtual address into the physical address includes translating the first or second virtual address into a physical address of a memory bank to which a smallest count value of virtual addresses are allocated among the plurality of memory banks.

13. The operating method of claim 10, wherein the translating of the first or second virtual address into the physical address includes translating the first or second virtual address into a physical address of a second storage area of the buffer memory when a total count value of virtual addresses allocated to the plurality of memory banks exceeds a threshold.

14. The operating method of claim 10, wherein the translating of the first or second virtual address into the physical address includes, in a stream operation mode translating the first or second virtual address based on a stream identifier provided from a host, into a physical address of a first memory bank among the plurality of memory banks.

15. The operating method of claim 10, wherein the translating of the first or second virtual address into the physical address includes:

translating the first virtual address into a physical address of a second memory bank among the plurality of memory banks; and translating the second virtual address into a physical address of a third memory bank among the plurality of memory banks.

16. The operating method of claim 10, further comprising updating a bitmap after translating the first or second virtual address into the physical address, the bitmap indicating whether physical addresses of each of the plurality of memory banks are allocable to the first virtual address or the second virtual address.

17. A computing system comprising:

a host; and a storage device configured to store data therein based on control signals from the host, wherein the storage device includes:

a buffer memory including a dynamic random access memory (DRAM) area;

a non-volatile memory device;

a first direct memory access (DMA) circuit configured to control DMA between the host and the buffer memory and output a first virtual address;

a second DMA circuit configured to control DMA between the buffer memory and the non-volatile memory device and output a second virtual address;

an address translation circuit configured to determine whether the first or second virtual address is included in a reference range, translate the first or second virtual address into a physical address of the DRAM area based on a count value of virtual addresses allocated to each of one or more memory banks and based on a mapping relationship between at least one virtual address and at least one physical address to provide the physical address when the first or second virtual address is included in the reference range, and skip translation to provide the first or second virtual address when the first or second virtual address is not included in the reference range; and a buffer controller configured to access the buffer memory based on the physical address or the first or second virtual address.

18. The computing system of claim 17, wherein the address translation circuit is further configured to:

translate the first or second virtual address into the physical address based on the mapping relationship when the first or second virtual address is included in the reference range; and provide the first or second virtual address to the buffer controller as the physical address by skipping translation when the first or second virtual address is not included in the reference range.

19. The computing system of claim 17, wherein the address translation circuit is further configured to:

determine the count value of virtual addresses allocated to each of one or more memory banks; and select a memory bank having a physical address corresponding to the first or second virtual address based on the determined count value of virtual addresses allocated to each of the one or more memory banks in the DRAM area.

20. The computing system of claim 19, wherein the address translation circuit is further configured to translate the first or second virtual address to a physical address of a memory bank to which a smallest count value of virtual addresses are allocated among the one or more memory banks.

* * * * *